Feb. 8, 1944.  A. SIMMON  2,341,393
EXPOSURE CONTROL MECHANISMS FOR CAMERAS
Filed March 4, 1943
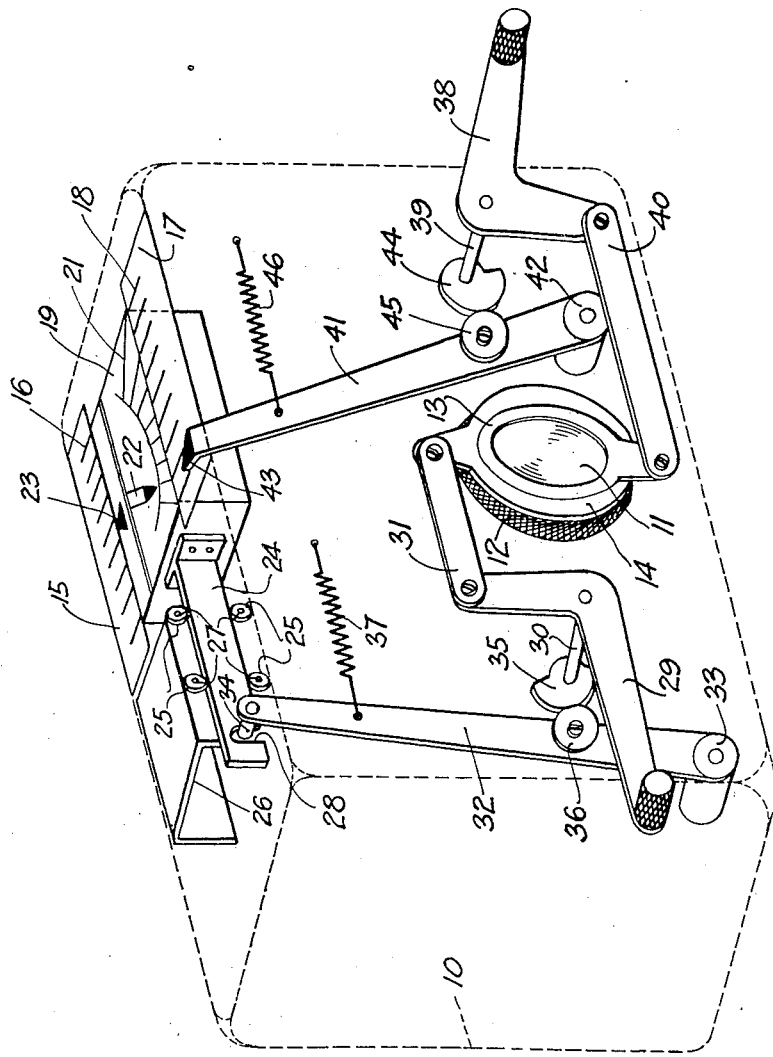
Alfred Simmon
INVENTOR.
BY Walter E. Wollheim
ATTORNEY.

Patented Feb. 8, 1944

2,341,393

UNITED STATES PATENT OFFICE 2,341,393

EXPOSURE CONTROL MECHANISM FOR CAMERAS

Alfred Simmon, Jackson Heights, N. Y.

Application March 4, 1943, Serial No. 477,912

2 Claims. (Cl. 95—10)

This invention relates to exposure control mechanisms for photographic cameras and is more particularly a preferred embodiment of the principles laid down in my co-pending application Serial #404,749.

The invention refers especially to cameras of the semi-automatic type having a built-in exposure meter and in which computing means are provided for coordinating the setting of the diaphragm and the speed adjustment of the shutter with the reading of the meter which are very simple to operate, easier to construct, and less confusing to the operator than in cameras as made heretofore.

The aforesaid computing means consist briefly of disposing the exposure meter slidingly between two straight scales, one of which is calibrated for shutter speeds, while the other one is calibrated in values of diaphragm openings, mechanism to bring the exposure meter to a desired position to conform with a selected shutter speed, and other mechanism to adjust manually the diaphragm opening according to the reading of the exposure meter in its selected position.

A preferred embodiment of the invention is illustrated in the accompanying drawing in which a perspective diagrammatic view of a camera is shown with the housing of the camera indicated in dotted lines only better to disclose the operating mechanisms.

In this drawing, 10 is a camera housing having a lens 11 mounted in a suitable shutter 12 mounted in its front. The shutter is, by way of example only, a typical "between the lens" shutter having a diaphragm adjusting ring 13 and a speed adjusting ring 14 concentrically disposed and coaxially with the lens.

At the top of the camera housing is a straight scale 15 calibrated at 16 with the various shutter speeds at which the camera can be operated. Another straight scale 17, parallel to but somewhat apart from scale 15, is calibrated at 18 in values of diaphragm openings or f numbers. 19 is an exposure meter slidingly disposed between scales 15 and 17. The meter is itself equipped with a scale 21 indicative of brightness values and a pointer 22 operated by an electric cell in the manner well known in the art. 23 is a fixed mark on the surface of the meter adjacent scale 15. 24 is a bar attached to one end of the exposure meter 19 supported by rollers 25 held in fixed spaced relation upon the side of a bracket 26 at the top of the camera by means of small shafts 27. 28 is a slot in bar 24 near its end.

A lever 29 pivotally mounted upon a shaft 30 adjusts by means of a link 31 the speed adjusting ring 14. A lever 32 is pivotally supported at 33 near the bottom of the camera housing 10, extends upwardly and has a pin 34 at its upper end engaging slot 28 in bar 24. A cam 35 is mounted on shaft 30 upon which lever 29 pivots and moves in unison therewith. 36 is a cam follower fastened to lever 32 engaging cam 35. The configuration of cam 35 is computed so as to cooperate with scale 15 in a desired manner. A spring 37 urges lever 32 and thereby follower 36 to be in contact with cam 35.

38 is a lever pivotally mounted upon a shaft 39 and adjusts by means of a link 40 the diaphragm adjusting ring 13. A lever 41 is pivotally supported at 42 near the bottom of the housing 10, extends upwardly and is bent over at its top at 43 to form an indicator adapted to slide along the markings 18 of scale 17. A cam 44 mounted upon shaft 39, engages a cam follower 45 fastened to lever 41. The configuration of cam 44 is such as to cooperate with scale 17 in a predetermined way. 46 is a spring urging lever 41 and thus follower 45 to be in constant contact with cam 44.

The details of the scale markings, the proportions of the cams, etc., are based upon formulae expounded in detail in application Serial #404,749. In the instant disclosure the mechanical means to carry out these requirements are described and shown.

The operation of the camera is, as follows:

The speed at which the picture is to be taken is determined first. Lever 29 is then moved, transferring its motion to cam 35, follower 36 and lever 32 for pin 34 to engage slot 28 of bar 24 which slides exposure meter 19 between scales 15 and 17 until the mark 23 on meter 19 registers with the corresponding speed marking upon scale 15. This simultaneously adjusts the speed adjusting ring 14 to give the shutter the desired speed. The camera is then pointed to the object to be photographed and causes the pointer 22 of the meter 19 to assume a certain position indicative of the brightness value. Lever 38 is then manipulated and cam 44, follower 45, and lever 41 moved until end 43 of lever 41 registers with that marking on scale 17 which is indicated by pointer 22 of meter 19. This simultaneously sets the diaphragm adjusting ring 13 to give the lens the proper opening conforming to the meter reading.

It is to be understood that the structure shown is applicable to different types of cameras by varying immaterial details only. The type of camera illustrated is used by way of example only. It is obvious therefore that many modifications may be made in the instrumentalities disclosed without departing from the principles of the invention, as defined in the appended claims.

What I claim as new, is:

1. Exposure control mechanism for cameras having in combination a lens with independent shutter speed adjusting means and diaphragm opening adjusting means, a pair of straight scales having, respectively, markings for shutter speeds and for diaphragm openings, an exposure meter slidably disposed between said scales, each of said adjusting means having connected thereto an independently operable control consisting of a pivoted lever, a cam adapted to operate in unison with said lever, and another lever adapted to be oscillated by said cam, the said other lever of the control for shutter speeds being adapted to slide said meter into a desired position for correct shutter speed, and said other lever of the control for diaphragm opening being adapted to cooperate with said scale having markings for diaphragm openings and to be set according to readings of said meter to adjust said diaphragm openings to proper size.

2. Exposure control mechanism for cameras having in combination a lens with independent shutter speed adjusting means and diaphragm opening adjusting means, a pair of straight scales having, respectively, markings for shutter speeds and for diaphragm openings, an exposure meter slidably disposed between said scales, each of said adjusting means having connected thereto an independently operable control consisting of a lever, a shaft pivotally supporting said lever, a link connecting said lever to its respective adjusting means, a cam mounted upon said shaft and adapted to operate in unison with said lever, and another lever adapted to be oscillated by said cam, the said other lever of the control for shutter speeds being adapted to slide said meter into a desired position for correct shutter speed, and said other lever of the control for diaphragm opening being adapted to cooperate with said scale having markings for diaphragm openings and to be set according to readings of said meter to adjust said diaphragm openings to proper size.

ALFRED SIMMON.